United States Patent [19]
Mannion et al.

[11] 3,875,995
[45] Apr. 8, 1975

[54] PROCESS FLUID FLOW PRIMARY AND SECONDARY REGULATION SYSTEMS

[76] Inventors: Gerald F. Mannion, 608 Bowlingreen Ct., Naperville, Ill. 60540; James R. Mannion, 10336 S. Kolmar, Oak Lawn, Ill. 60454

[22] Filed: Apr. 23, 1973

[21] Appl. No.: 353,530

Related U.S. Application Data

[63] Continuation-in-part of Ser. No. 172,504, Aug. 17, 1971, Pat. No. 3,729,051.

[52] U.S. Cl. ............ 165/22; 137/486; 165/40
[51] Int. Cl. ............................................ F24h 3/00
[58] Field of Search .......... 165/32, 22, 40; 137/486, 137/488; 236/26

[56] References Cited
UNITED STATES PATENTS

| | | | |
|---|---|---|---|
| 2,871,878 | 3/1959 | Shannon | 137/486 |
| 3,134,429 | 5/1964 | Heller et al. | 165/40 |
| 3,612,164 | 10/1971 | Miner | 165/22 |

*Primary Examiner*—Manuel A. Antonakas
*Attorney, Agent, or Firm*—Kinzer, Plyer, Dorn & McEachran

[57] ABSTRACT

A primary flow regulation control and system for regulating the flow of chilled water, hot water, or other incompressible process fluid to a series of utilization stations having common feeder and return lines and each having its own inlet pump. The system includes primary sensing means for sensing static pressures of the fluid in the inlet and outlet connections of each utilization station, a primary regulating valve interposed in the station outlet, and a primary control, actuated by the sensing means, for adjusting the primary regulating valve to maintain the static pressure differential between the inlet and outlet within a limited range. A secondary control regulates the feedback or bypass between the inlet and outlet of the utilization station. This secondary control includes a bridge conduit connecting the inlet and outlet conduits, a secondary flow regulating valve interposed in the bridge conduit, a secondary sensing means for sensing at least one parameter at the utilization station, and a secondary control means for continuously adjusting the secondary regulating valve to maintain the sensed parameter of the utilization station at a given level.

6 Claims, 3 Drawing Figures

PROCESS FLUID FLOW PRIMARY AND SECONDARY REGULATION SYSTEMS

CROSS REFERENCE TO RELATED APPLICATION

This application is a continuation-in-part of, and is directed to an improvement of the invention disclosed in, application Ser. No. 172,504 of Gerald F. and James R. Mannion, filed Aug. 17, 1971 and issued Apr. 24, 1973 as U.S. Pat. No. 3,729,051.

BACKGROUND OF THE INVENTION

There are a number of applications in which a process fluid distribution system may be employed to furnish process fluid to a series of different utilization stations at which the flow requirements may vary over a rather wide range. Thus, in many large commercial, industrial, and even educational plants there are relatively critical requirements for chilled water, for hot water, or for both, at numerous locations which are widely separated from the heaters and chillers that constitute the basic water sources. A continuous flow of either hot water or chilled water at a given rate may be essential at any of the utilization stations. For example, the flow of chilled water to a computer, for cooling purposes, may be essential on a twenty-four hour basis. The computer, however, may be incorporated in the same distribution system with other equipment that requires a flow of chilled water only on an intermittent basis or only during limited hours of the day or on certain days of the week. Other installations in the same system may require either hot water or cold water, or both, for equally critical applications.

One frequently employed distribution system of this general kind employs a bridge circuit in the input of each utilization station. The bridge most frequently used is quite simple in construction and comprises a conduit directly interconnecting the inlet and the outlet of the utilization station. The bridge usually includes a throttling valve that is adjusted to afford a very limited flow or approximately zero flow in the bridge interconnection conduit when the utilization station is drawing its maximum flow from the distribution system. Adjustment must be made for maximum flow, since an inadequate flow from the feeder line and to the return line of the distribution system will result in uncontrolled recirculation of the process fluid within the utilization station, with potentially disastrous results.

The conventional bridge arrangement, although it affords efficient and effective operation where the flow requirements of the utilization stations remain essentially constant, is inherently uneconomical and wasteful in operation in applications where there is any substantial decrease in the flow requirement of any major utilization station. Thus, in order to assure effective operation, the feeder and return lines of the distribution system, using conventional bridge regulation, must maintain a constant flow equal to the maximum requirement of the entire system. If this is not done, any given utilization station may fail to receive an adequate supply of the process water or other process fluid.

One proposed solution of this problem has been to incorporate flow sensors in each of the utilization stations, and to connect all of the flow sensors back to a central control point, usually located at the supply point for the distribution system. To be effective, an arrangement of this kind requires the incorporation of motor-actuated throttling valves at each utilization station in the system, together with relatively elaborate controls at a centralized control point and extensive wiring between the control point and all of the utilization stations. This results in an expensive control arrangement that may still require continuous monitoring by a control operator.

Moreover, although uncontrolled recirculation of the process fluid within the utilization stations is quite undesirable, it is often useful to have initial input values for the process fluid. Thus, if the available hot water source is maintained at a temperature of 200°F and a given utilization station requires an input water temperature of 180°F, the utilization station would draw both hot water and chilled water to obtain the given temperature. This places a burden on the entire system and creates an inherent operational inefficiency.

SUMMARY OF THE INVENTION

It is a principal object of the present invention, therefore, to provide a new and improved primary and secondary flow regulated distribution system for an incompressible process fluid, utilizing static pressure controls for the individual utilization stations of the distribution system, that inherently and effectively overcomes the difficulties and disadvantages of previously known systems.

A particular object of the invention is to provide a new and improved static pressure flow regulation unit for a process fluid distribution system, that makes practical the adjustment of the total flow in the distribution system without requiring interconnection of individual utilization stations in the system to a central control point.

Another object of the invention is to afford a new and improved primary and secondary flow regulation unit for a process fluid distribution system that can be constructed as a prefabricated unit adaptable for use at a variety of fluid utilization stations without substantial modification.

An additional object of the invention is to provide a new and improved primary and secondary regulated flow distribution system for an incompressible process fluid, such as hot water or cold water, that permits the practical application of thermal control as the basis for regulation for the fluid rate to the primary feeder and return lines of the system despite substantial variations in the actual flow requirements at individual utilization stations along the system.

A specific object of the invention is to provide a new and improved primary and secondary flow regulation unit for a process fluid distribution system that is capable of controlling the supply of two different process fluids, such as hot water and cold water, in alternation, to a single utilization station.

Accordingly, the invention relates to a regulated flow distribution system for an incompressible process fluid, as for example, hot water or cold water. The distribution system comprises a feeder line, a process fluid source including pumping means for pumping incompressible process fluid into the feeder line, a series of utilization stations distributed along the feeder line with each station having its own input pump, and a return line from all of the stations back to the process fluid source. The system further comprises a series of flow regulation units, one for each utilization station. Each regulation unit comprises an inlet conduit connecting the feeder line to the inlet of its utilization station, an outlet conduit connecting the utilization station back to the return line, and a primary flow regulating valve interposed in the outlet conduit. The regulation unit further includes first static pressure sensing means for sensing the static pressure of the fluid in the inlet conduit and second static pressure sensing means for sensing the static pressure of the fluid in the outlet conduit upstream of the primary regulating valve. A primary control means, connected to both pressure sensors, continuously adjusts the primary regulating valve to maintain the differential in static pressures between the inlet and outlet conduits within a given limited range over a substantial range of absolute static pressures, independently of changes in the rate of flow of fluid into and out of the utilization station.

In the preferred construction, there is a complimentary secondary flow regulation system comprising a bridge conduit connecting the inlet and outlet conduits and a secondary flow regulating valve interposed in the bridge circuit. A secondary sensing means is provided for sensing at least one operating parameter (i.e., temperature) of the utilization station, and a secondary control means is connected to secondary sensing means and to secondary regulating valve for continuously adjusting the secondary regulating valve to maintain the sensed parameter of the utilization station at a given level.

DESCRIPTION OF THE PREFERRED EMBODIMENTS

Figure 1:
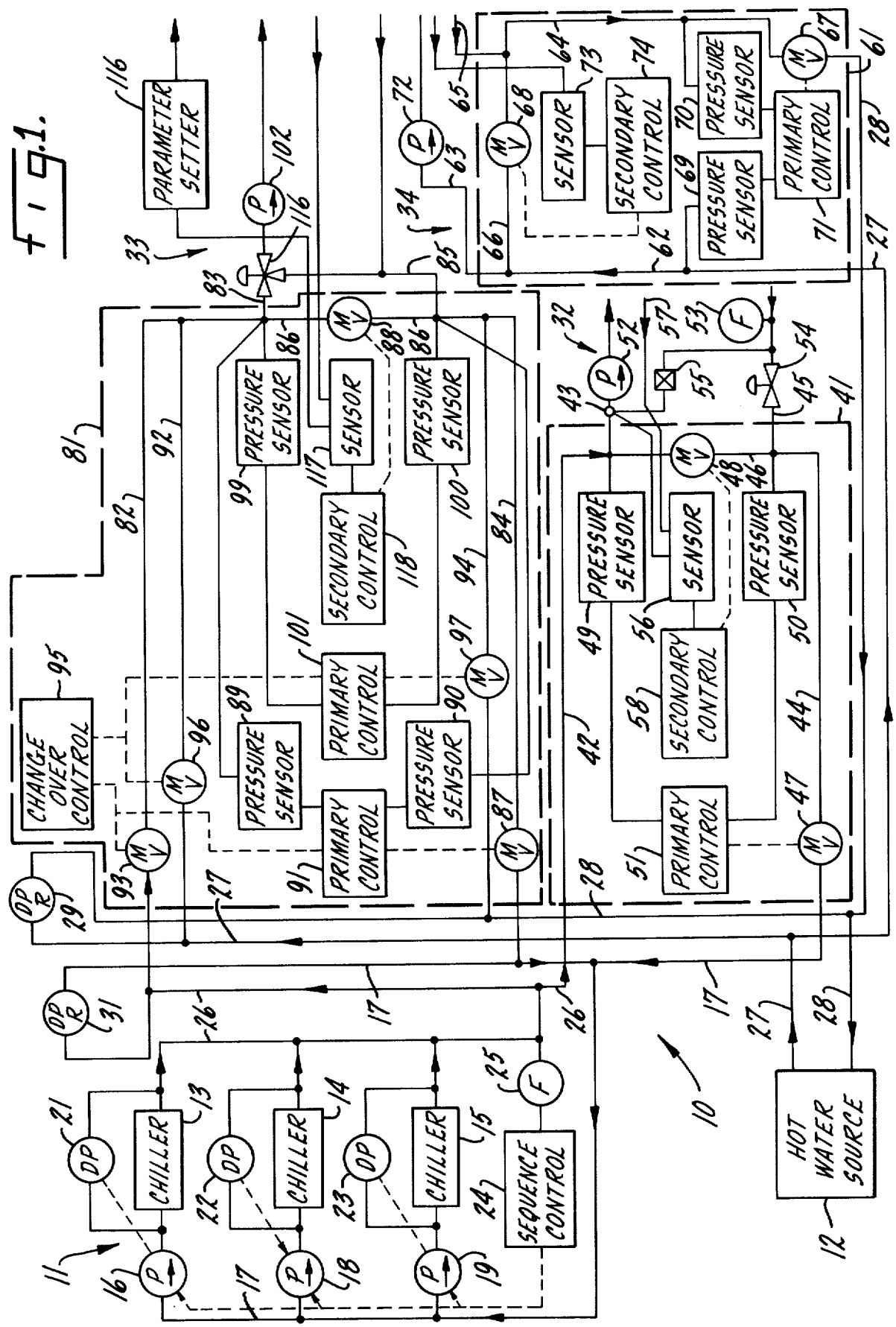
FIG. 1 is a schematic diagram of a regulated flow distribution system for incompressible process fluids constructed in accordance with one embodiment of the present invention.

FIG. 1 illustrates, in schematic form, a regulated flow distribution system 10 for incompressible process fluids that is constructed in accordance with one embodiment of the present invention and that incorporates flow regulation units constructed in accordance with the invention. Distribution system 10 comprises two process fluid sources, a chilled water source 11 and a hot water source 12. The chilled water source 11 is shown in some detail; in comprising three individual water chillers 13, 14 and 15, which may be of conventional construction. Chiller 13 is provided with an input pump 16, the inlet to pump 16 being connected to a return line 17. Similarly, the input to chiller 14 is connected to a pump 18 that is supplied from the return line 17, and chiller 15 has its inlet connected to a pump 19 that is also supplied from return line 17.

In the chilled water source 11, chiller 13 is provided with a differential pressure sensing device 21 that is connected to the inlet and to the outlet of the chiller. Device 21 is connected to pump 16 to shut down operation of the chiller 13 when the flow of water through the chiller is reduced to a level such that the chiller might freeze up. Similarly, chiller 14 is equipped with a differential pressure sensing device 22 connected to pump 18 to afford a safety control for chiller 14. A corresponding arrangement, comprising a differential pressure sensing device 23, is provided for chiller 15 and its pump 19.

Further control for the chilled water source 11 is provided by a sequence control unit 24. Control unit 24 is actuated by a flow sensor 25 connected to a main feeder line 26 to which the outputs of all three chillers 13–15 are connected. Sequence control 24 is connected to the three chiller pumps 16, 18 and 19 to actuate those pumps in sequence and number, dependent upon the instantaneous fluid flow in feeder line 26 as determined by sensor 25.

The second source of incompressible process fluid, hot water source 12, is illustrated only generally in FIG. 1. It includes appropriate apparatus for heating process water and for pumping the water into a main feeder line 27. The hot water is returned to source 12 through a return line 28. A differential pressure relief device 29 is connected between the hot water feeder and return lines 27 and 28 at the end of those lines most distant from source 12. The differential pressure relief device 29 may be of known construction and is not critical to the present invention. A similar pressure differential relief device 31 may be connected across the chilled water feeder and return lines 26 and 17.

Distribution system 10 further comprises a series of utilization stations distributed along each of the two process fluid feeder lines 26 and 27. Two utilization stations 32 and 33 are shown connected to the chilled water feeder line 26. Similarly, two process fluid utilization stations 33 and 34 are shown connected to the hot water feeder line 27. Thus, utilization station 33 is common to the two parts of the distribution system 10 comprising the chilled water feeder line 26 and the hot water feeder line 27. It should be understood that in most systems, such as system 10, there will be a much larger number of utilization stations.

A first flow regulation unit 41 is incorporated in distribution system 10 and is interposed between utilization station 32 and the distribution lines comprising chilled water feeder line 26 and its return line 17. Flow regulation unit 41 comprises an inlet conduit 42 that connects the chilled water feeder line 26 to the inlet 43 of utilization station 32. Regulation unit 41 further comprises an outlet conduit 44 that connects the outlet 45 of utilization station 32 to the chilled water return line 17. A bridge interconnection conduit 46 interconnects the inlet conduit 42 with the outlet conduit 44. A secondary flow regulating valve 48 is interposed in bridge conduit 46. A primary flow regulating valve 47 is interposed in the outlet conduit 44, downstream of the connection to the station outlet 45. Regulating valves 47 and 48 are motorized throttling valves, each adapted for control in response to an electrical, pneumatic, hydraulic, or mechanical input signal.

A first static pressure sensing means 49 is connected to the junction of conduits 42 and 43, and a second static pressure sensing means 50 is connected to the junction of conduits 44 and 45. These first and second static pressure sensors 49 and 50 are incorporated in control means for continuously adjusting valve 47 to maintain the pressure differential between the two pressure sensors within a limited range despite susbstantial changes in the absolute inlet flow rate from feeder line 26 to utilization station 32. In addition, the control means for regulation unit 41 includes a differential comparator control 51 having two inputs, one connected to each of the pressure sensors means 49 and 50, and having an output connected to regulating valve 47. Differential control 51 may be of conventional construction, and may afford electrical, mechanical, pneumatic or hydraulic control signals to valve 47.

Utilization station 32 is not shown in particular detail. The utilization station does include a pump 52 that controls the rate at which fluid is drawn from feeder line 26 to the chilling coils or other apparatus at the utilization station (not shown). The utilization station may include other devices, such as a flow sensor 53 and valves 54 and 55. The particular type of apparatus used at utilization station 32 is not critical to the invention, except that the utilization station apparatus does include an input pump such as pump 52.

At least one secondary sensing means 56 is connected to the utilization station 32 to measure at lease one operating parameter, such as temperature. For instance, the secondary sensing means 56 could be connected to the inlet 43 of the utilization station 32 or to some other point 57 of the utilization station 32. The exact point 57 is not shown, but it is conveniently any point at which a controlling parameter of the utilization station 32 can be sensed. This secondary sensing means 56 is connected to a secondary control means 58 which has an output connected to the secondary regulating valve 48. The control 58 may be of conventional construction and may afford electrical, mechanical, pneumatic or hydraulic control signals to valve 48 for continuously adjusting valve 48 to maintain the sensed parameter of the utilization station at a given level.

A second flow regulation unit 61 is utilized in conjunction with utilization station 34, being interposed between the utilization station and the hot water feeder and return lines 27 and 28. Thus, flow regulation unit 61 comprises an inlet conduit 62 that connects the hot water feeder line 27 to the input 63 of utilization station 34. An outlet conduit 64 connects the outlet 65 of utilization station 34 to the hot water return line 28. A bridge interconnection conduit 66 connects inlet conduit 62 to outlet conduit 64; a secondary motorized regulating valve 68, is interposed in conduit 66. As before, a primary motorized regulating valve 67 is interposed in the outlet conduit 64 downstream of the outlet 65.

The primary control means for regulation unit 61 comprises a two static pressure 69 and 70; sensor 69 is connected to inlet conduit 62 and sensor 70 is connected to the outlet conduit 64 upstream of valve 67. The pressure sensors are hydraulically connected to two inputs of a differential control 71 having an output connection to the motorized primary regulation valve 67. No detailed construction is illustrated for utilization station station 34, other than an input pump 72, since the apparatus incorporated in the utilization station may vary widely and is not critical to the present invention.

As before, a secondary sensing means 73 is connected to the utilization station 34 to measure a parameter such as temperature. Sensor 73 is connected to the input of a secondary control means 74 whose output is connected to the secondary regulating valve 68. Valve 68 is controlled to maintain the sensed parameter at a given value, by continuously throttling the flow of fluid in conduit 66 in both directions.

The flow regulation unit 81 for utilization station 33 in distribution system 10 is somewhat more complex than units 41 and 61 but follows the same general type of construction. The additional complexity is caused by the fact that utilization station 33 requires a supply of either chilled water or hot water, at different times, depending upon changes in the operating cycle of the utilization apparatus.

Flow regulation unit 81 comprises a first inlet conduit 82 that connects the chilled water feeder line 26 to the inlet 83 of utilization station 33. A first outlet conduit 84 connects the outlet 85 of utilization station 33 back to the chilled water return line 17. The inlet and outlet conduits 82 and 84 are interconnected by a conduit 86. A motorized secondary regulating valve 88 is interposed in conduit 86. A primary flow regulating valve, shown as a motorized valve 87, is interposed in the cold water outlet conduit 34. In addition, a cut-off valve, shown as a motorized valve 93, is interposed in the cold water inlet conduit 82.

There is also a hot water inlet conduit 92 that connects the hot water feeder line 27 to the inlet 83 of utilization station 33, and a hot water outlet conduit 94 connecting the outlet 85 of utilization station 33 back to the hot water return line 28. The bridge conduit 86 is common to both the chilling and hot water paths, interconnecting conduits 92 and 94 as well as conduits 82 and 84. A hot water primary regulating valve 97 is interposed in the hot water outlet conduit 94. A motorized shut-off valve 96 is interposed in the hot water inlet conduit 92.

The control means for regulation unit 81 comprises two primary static pressure sensors 89 and 90; sensor 89 is connected to inlet 82 and sensor 90 is connected to outlet 84 upstream of valve 87. Pressure sensors 89 and 90 are connected to two inputs of the cold water primary differential control 91. Control 91 is connected to and actuates the primary throttline valve 87 in the chilled water outlet conduit 84. Also included in flow regulation unit 81 are two additional primary pressure sensors 99 and 100. Sensor 99 is connected to inlet 92 and sensor 100 is connected to outlet 94 upstream of valve 97. Pressure sensors 99 and 100 are connected to two inputs of the hot water primary differential control 101 that is connected to and actuates the primary throttling valve 97 in the hot water outlet conduit 94. The two controls 91 and 101 are both connected to an interlock or changeover control 95 that is employed to actuate the shut-off valves 93 and 96 in the inlet conduits 82 and 92.

Utilization station 33, like the other utilization stations, includes its own inlet pump 102. The coils, heat exchangers, and other apparatus for the utilization station 33 have not been illustrated, since their construction, apart from the presence of pump 102, is not critical to the present invention. It will be recognized that all of the utilization stations may include auxiliary apparatus, such as the isolation valve 116 in station 33, but these have been generally omitted from the drawing for purposes of simplification and clarification.

A secondary sensing means 117 is connected to utilization station 33 to measure some operating parameter, such as temperature, in the station. Secondary sensor 117 is connected to the input of a secondary control means 118 whose output is connected to the secondary regulating valve 88. Valve 88 is controlled to maintain the sensed parameter at a given valve by continuously adjusting the opening and closing of valve 88 to allow flow in either direction through conduit 86.

In considering operation of the dual fluid distribution system 10, initial attention may be directed to the chilled water source 11. At each of the chillers 13-15, water is pumped from return line 17 into the chillers by one of the pumps 16, 18 and 19. The resulting flow in the chilled water feeder line 26 is sensed by the flow sensor 25. If the total flow is sufficient to require the use of all three chillers, sequence control 24 maintains all of the chillers in operation. When the flow is reduced to a point at which it could be handled by two of the chillers, one chiller is removed from service by sequence control 24. If the flow is reduced further, a second chiller is placed on a standby basis by sequence control 24. The sequence control 24 is constructed to rotate usage among the three chillers.

A safety control for chiller 13 is provided by the differential pressure sensor 21 and its connection to pump 16. For most conventional chiller equipment, operation at a level below about sixty percent of the chiller capacity can lead to a freeze-up, removing the chiller from service and creating a possibility of damage to the chilling apparatus. The differential pressure control, which is usually incorporated as an integral part of commercial chiller equipment, protects against this possibility by regulating the operation of pump 16 to maintain at least a minimum pressure drop through the chiller, indicating a minimum flow, and to cut off the chiller if necessary.

In the chilled water system comprising feeder line 26 and return line 17, the differential pressure relief device 31 measures the differential in pressure between the two lines. If excessive pressure is developed in feeder line 26, as could result from a malfunction of sequence control 24 and excessive pumping of chilled water into the feeder line, relief device 31 acts to reduce the pressure differential by bypassing some of the water into return line 17. The safety control comprising differential pressure relief device 31 may bee of known construction.

The actual flow of water in utilization station 32, in system 10, is controlled primarily by the utilization station itself, through control of the pump 52 and other components of the utilization station. For ideal operation, regulating valve 47 is adjusted so that there is nearly no pressure difference between pressure sensor 49 and pressure sensor 50. For these conditions the regulating valve 47 allows a flow to return line 17 that exactly balances the inlet flow from feeder line 26. However, any substantial change in the flow requirement of utilization station 32 requires a change in the setting of primary regulating valve 47 in order to maintain this optimum condition.

When pressure sensor 49 and pressure sensor 50 both register the same static pressure, the difference is negligible and indicates that the flow is virtually equalized in both the inlet conduit 42 and the outlet conduit 44; the primary regulation unit 41 is properly balanced and there is no need to adjust valve 47. If pressure sensor 49 senses a greater pressure than pressure sensor 50, then an excess of chilled water is being supplied to utilization station 32. The resulting waste of chilled water is precluded by control 51, which detects the differential in the two outputs of the primary pressure sensors 49 and 50 and throttles down regulating valve 47 to balance the pressures measured by the two primary sensors.

It may also happen that the chilled water requirement for utilization station 32 increases above the flow to return line 17 permitted by the instantaneous setting of regulating valve 47. Under these circumstances, a lower pressure is detected by sensor 49 than by sensor 50. If a greater pressure is detected in sensor 50, control 51 is actuated to adjust regulating valve 47 to permit a greater flow to return line 17, again balancing the pressures between sensors 49 and 50. Whenever the pressures the balanced, the flow rates are balanced.

It is particularly important to prevent any uncontrolled recirculation flow in utilization station 32 for an extended period of time, since such recirculation may permit a substantial change in the temperature of critical components incorporated in the utilization apparatus. However it may be desirable to supply chilling fluid to station 32 at a temperature higher than the temperature provided by the chilled fluid source 11. For example, when the water from the chilled water source 11 is at 5°C and the utilization system 32 functions best with a chilling water temperature of 20°C, and the temperature of the water returning from system 32 is 30°C, the secondary temperature sensor 56 at inlet 43 would initially register 5°C. This temperature is signalled to the secondary control 58 by a secondary sensor 56. The secondary control 58 opens secondary control valve 48 to allow some of the 30°C water from outlet 45 to feed back through bridge conduit 46 into inlet 43. This continues until the temperature sensed at inlet 43 reaches 20°C. If the temperature at inlet 43 exceeds 20°C, then the secondary control 58 throttles valve 48 down so that not as much of the 30°C water from outlet 45 returns to mix with the chilled water from conduit 42. Thus, the secondary control continuously monitors the temperature of the inlet fluid at inlet 43 and continuously adjusts the secondary flow regulating valve 48 to achieve the given temperature. Although the sensed parameter is temperature, any other parameter which can be controlled by mixing of the outlet and inlet streams, such as flow, or index of refraction, can be employed.

The operation of flow regulation unit 61 is essentially the same as described above for unit 41 except that the control is exercised with respect to heated water instead of chilled water. Primary control 71, operating on the basis of static pressure singals from sensors 69 and 70, adjusts valve 67 to maintain an equalized flow in the inlet conduit 62 and outlet conduit 64. As before, control 71 is adjusted to provide a limited differential, within maximum and minimum threshold values, between static pressures at the inlet conduit 62 and the outlet conduit 64. Sensor 73 and secondary control 74, on the other hand, regulate feedback of fluid from outlet 65 to inlet 63 (or bypass of fluid from inlet 63 to outlet 65) in response to some operating parameter of station 34.

Despite its somewhat greater complexity, flow regulation unit 81 operates in bascially the same manner as units 41 and 61. Changeover control 95 is externally connected to some part of the apparatus in utilization station 33 that determines whether chilled water or heated water is required for current operation. Assuming initially that chilled water is required, changeover control 95 operates to close the shut-off valve 96 in the heated water inlet conduit 92 and also operates to close the regulating valve 97 in the outlet conduit 94, the latter operation being effected through control unit 101. This leaves primary working control to the chilled water control device 91. The differential controller 91 continuously compares the static pressure outputs of sensors 89 and 90 and adjusts the outlet regulation valve 87 to maintain a given pressure differentiation within predetermined limits, between inlet 82 and outlet 84. Shut-off valve 93 is maintained full open. Under these circumstances, it may be seen that control is exercised in the same manner as for either of the regulation units 41 and 61.

When the requirements of utilization station 33 change from chilled water to heated water, this change is signalled to control 95, which operates to close the chilled water inlet and outlet valves 93 and 87 and to open the heated water inlet and outlet valves 96 and 97. Control is then exercised by control unit 101, which compares the static pressures from sensors 99 and 100 and adjusts the outlet conduit throttling valve 97 accordingly. Again, therefore, control of the heated water flow is maintained in essentially the same manner as for the simpler single-fluid regulation units.

During either the hot water cycle or the chilling water cycle, the secondary flow regulating control 118 can vary the flow through the secondary regulating valve 88. For example, station 33 could comprise processing equipment for a chemical reaction batch which is endothermic and needs to be heated at a constant rate from 50°C to 90°C, at which point the batch becomes exothermic and must be maintained at 100°C. If the chilling water source 11 is at 5°C and the hot water source 12 is at a pressure high enough to maintain a 120°C temperature, it is undesirable to switch from full chilling water of 5°C to full hot water of 120°C in the batch heat transfer coils (not shown). Also, to heat or chill at a constant rate, it is undesirable to pass the maximum hot or cold temperature water through the heat transfer coils, since the rate of heating or cooling will be large when the temperature difference between the batch and the water is large and the rate will be progressively slower as the difference in batch and water temperatures become smaller.

Thus, in operation of the primary and secondary flow regulating unit 81 for this example, the hot water inlet valve 96 and outlet valve 97 would initially be open and the primary control 101 would balance the flows in these two conduits. The parameter being sensed in station 33 by sensor 117 is the batch temperature, which initially is at 50°C. The given value of this parameter is varied at a constant rate from 50°C to 100°C; this is done either by resetting the given value a certain number of degrees per unit time or by automatically doing this with a mechanically driven temperature controller 116. This may be easily accomplished by conventional means, for instance by using a theromcouple as the secondary sensor 117 to apply a temperature-indication voltage to the secondary control 118 for comparison with a voltage from the temperature setter 116, which operates to provide a voltage corresponding to a given setting on a temperature dial. Thus, the dial is set to a given temperature and the temperature setter 116 emits the same voltage as the thermocouple should develop at the given temperature.

Secondary controller 118 compares the temperature or voltage from sensor 117 with the preset voltage from setter 116. Then, secondary controller 118 opens or closes the secondary regulating valve 88 to provide the given temperature. Thus, initially enough water is fed back through secondary valve 88 to cool the incoming hot water from 120°C to 55°C as the batch is heated from 50°C; the overall flow through the primary valve 97 is essentially only the amount of hot water necessary to heat the batch at the desired rate and to balance the heat loss of station 33. At the time when the batch reaches 80°C, more hot water is being used, due to increased heat loss in station 33; however, since the rate of heating is constant, the same amount of hot water is being used to heat the batch. When the batch starts a mild exotherm at 90°C, the water returning from the outlet conduit 85 is hotter than the inlet 83 water, so the changeover control 95 switches from hot water to chilling water. After changeover, the primary outlet valve 87 initially allows only a small amount of flow through the station 33, since only a small amount of 5°C water is being used to cool the batch; most of the outlet 85 water is being fed back to inlet 83 through the secondary valve 88. However, if at 100°C a vigorous exotherm begins, heating the cooling water from 95°C to 120°C, then the primary valve 87 opens to allow more chilling water through station 33 and the secondary valve 88 closes down to minimize the feedback of heated water. Thus, the primary and secondary valves coact to regulate the needs of the distribution system and each individual utilization station. Essentially, only enough hot or chilling water is drawn from the hot or chilling water sources as is necessary to meet the heating or cooling requirements of each utilization station.

The flow regulation units 41, 61 and 81 of distribution system 10 provide for effective control of the individual stations along the distribution system 10 without requiring a continuous flow of maximum quantity in the feeder and return lines of the system. There is no necessity for interconnection of the individual flow regulation units to a central control point; the controls for fluid sources 11 and 12 need not be connected to the individual utilization stations as in previously known regulation systems. The individual flow regulation units, such as units 41, 61 and 81, can be readily constructed as prefabricated units adaptable for use at a variety of different utilization stations without substantial modification. For example, if the flow ranges for utilization stations 32 and 34 are generally similar, the flow regulation units 41 and 61 can be identical in construction. Regulation unit 81, on the other hand, can be utilized without substantial change for a variety of different stations that require two different process fluids, such as hot water and cold water, in alternation.

Figure 2:
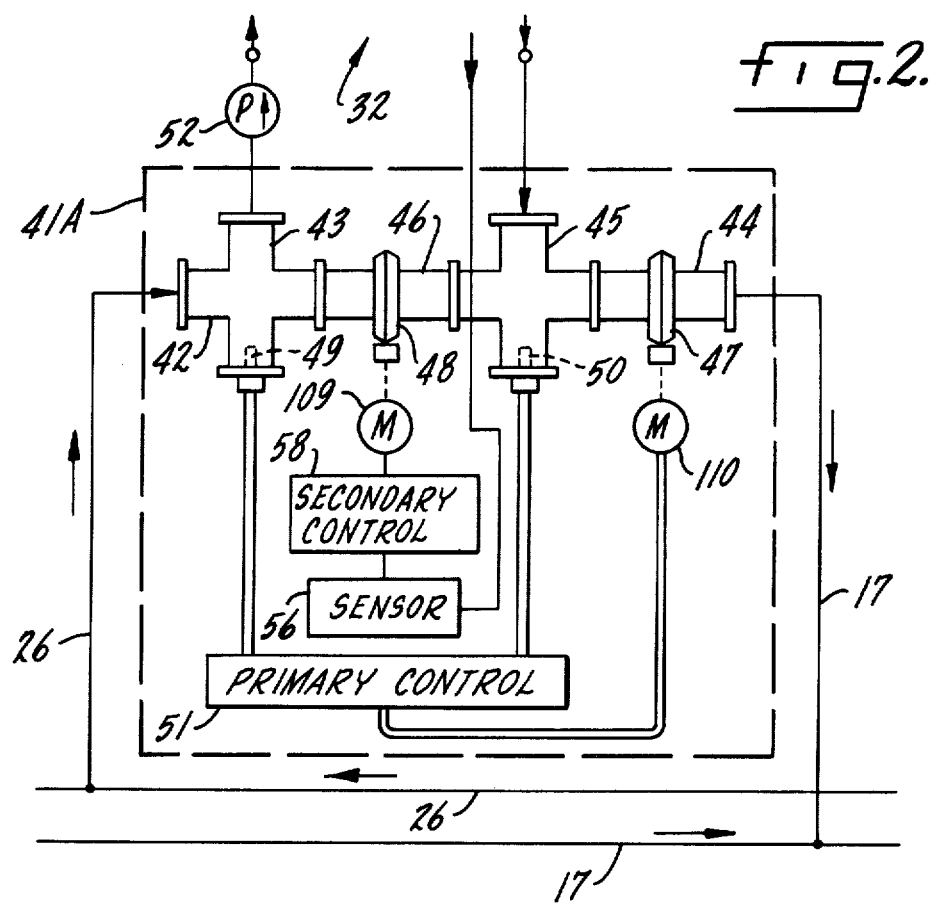
FIG. 2 is a more detailed illustration of a flow regulation unit constructed in accordance with the invention; and, FIG. 3 is a simplified schematic drawing of one form of control device that can be used in the system of FIG. 1.

FIG. 2 illustrates a flow regulation unit 41A that may be substituted for either of the regulation units 41 and 61 in distribution system 10 (FIG. 1). As shown in FIG. 2, flow regulation unit 41A comprises an inlet conduit 42 employed to connect the process fluid feeder line 26 to the input 43 of a utilization station 32 that includes an input pump 52. The outlet 45 of utilization station 32 is connected to the return line 17 of the distribution system by the outlet conduit 44. Conduits 42 and 44 are interconnected by a bridge interconnection conduit 46. A motorized secondary flow regulating valve 48 is interposed in conduit 46. Valve 48 is controlled by a control 58, which drives a motor 109. Control 58 is actuated in accordance with an input from a sensor 56, which senses some control parameter from station 32. Also, valve 48 can be opened for flushing or for emergency operation of the unit as a conventional bridge. A motor-driven primary regulating valve 47 is interposed in the outlet conduit 44, downstream from the station outlet 45.

The control means incorporated in primary flow regulation unit 41A comprises two static pressure sensors 49 and 50 in the inlet and outlet conduits 43 and 45, respectively. Sensors 49 and 50 are each connected to a differential control 51 that actuates the primary regulating valve 47. Primary control 51 can be a conventional differential pressure control, which is shown with a pneumatic output connection to actuate a motor 110 that controls the setting of valve 47.

As pointed out above, the optimum operating condition for the primary regulating unit, in most instances, is one of minimal pressure variation because the inlet 43 and the outlet 44. Higher pressures in either sensor 49 or 50 can be utilized by control 51 to adjust valve 47 until a desired condition is obtained with respect to flow in station 32. It is thus seen that control unit 41A affords the basic control required for units 41 and 61, as described above, and provides effective regulation of the fluid supply to utilization station 32. Regulation unit 41A is easy to assemble as a prefabracated unitary device, since both pressure sensors 49 and 50 are readily connected to the outlet and inlet fittings.

Figure 3:
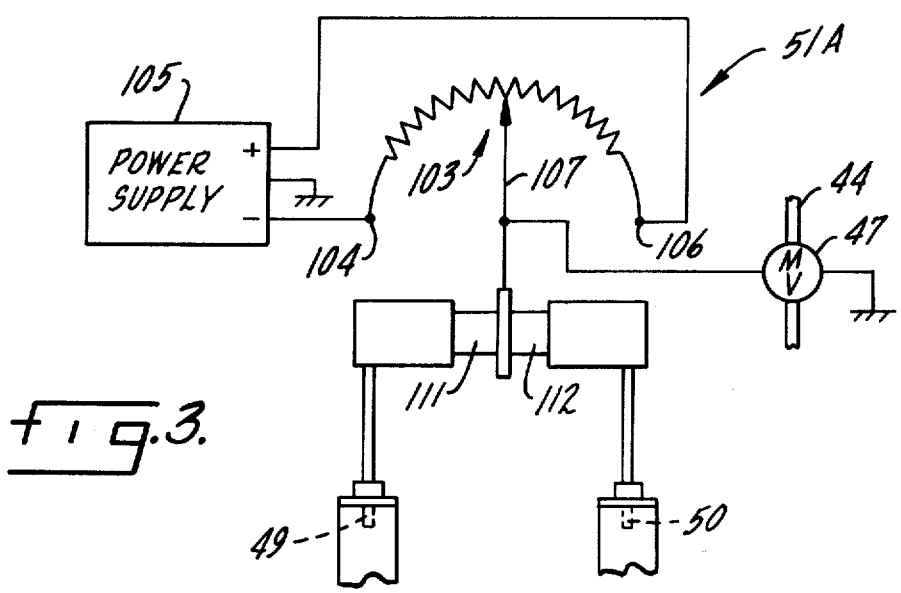

FIG. 3 illustrates, in simplified schematic form, a device 51A that may be utilized as the control 51 in regulation unit 41. As shown in FIG. 3, device 51A comprises a potentiometer 103 having a first terminal 104 connected to the negative terminal of a power supply 105 and having a second terminal 106 connected to the positive terminal of the power supply. Power supply 105 includes a ground connection. The movable tap 107 of potentiometer 103 is electrically connected to the motor of the motorized regulating valve 47, which is returned to system ground. Static pressure sensor 49 actuates a plunger 111 that engages one side of the free end of potentiometer tap 107. Static pressure sensor 50 actuates a plunger 112 that also engages the free end of the potentiometer arm, but from the opposite side.

An increase in static pressure detected by sensor 49 exceeding the static pressure sensed by sensor 50, actuates plunger 111 and causes potentiometer arm 107 to pivot in a counterclockwise direction. Conversely, a decrease in the static pressure sensed by sensor 49 causes the plungers 111 and 112 to rotate the potentiometer arm 107 in a clockwise direction. It can thus be seen that the energization of the motor of regulating valve 47 varies in accordance with the changes in static pressure detected by the two sensors 49 and 50 and this variation is utilized to adjust valve 47 until the desired balanced pressures are achieved as described above by throttling the flow of fluid through outlet 44.

The device 51A illustrated in FIG. 3 is merely exemplary of one simple form of apparatus that can be used for the comparison and control operations required in the regulating units of the invention; other control devices capable of comparing the outputs of the two sensors 49 and 50 on an electrical, pneumatic, hydraulic, or mechanical basis can be utilized as desired. Moreover, a similar type of control can be used for secondary regulating valve 48 when the system parameter measured in pressure.

Another feature of the present invention is that it can incorporate the primary flow regulation units described in U.S. Pat. No. 3,729,051 in conjunction with the secondary flow regulators of the present application. Thus, a bypass bridge containing a flow sensor can be used to sense changes in flow, and the flow in the bypass bridge can be balanced to achieve primary flow control. Any of the combined primary flow units disclosed may be used in conjunction with the secondary flow control units of the present invention. Also, both pressure and flow sensors may be used interchangable.

We claim:

1. A primary and secondary flow regulation unit for a process fluid distribution system of the kind which comprises means for pumping an incompressible process fluid from a process fluid source into a feeder line for distribution through individual flow regulation units to a series of utilization stations, each of which may include its own input pump, and further comprising a return line for returning fluid for each utilization station, through the regulation unit for that station, back to the source, the flow regulation unit comprising:

an inlet conduit connecting the feeder line to the inlet of a utilization station;

an outlet conduit connecting the outlet of the utilization station to the return line;

a primary flow regulating valve interposed in the outlet conduit;

primary sensing means for sensing fluid pressure conditions representative of a pressure differential between the fluid in the inlet conduit and the fluid in the outlet conduit;

primary control means, connected to the primary sensing means and to the primary regulating valve, for continuously adjusting the primary regulating valve to maintain the pressure differential within a given limited range independently of changes in the rate of flow of fluid into and out of the utilization station;

a bridge conduit connecting the inlet conduit and the outlet conduit;

a secondary flow regulating valve interposed in the bridge conduit;

a secondary sensing means for sensing at least one operating parameter of the utilization station; and secondary control means, connected to the secondary sensing means and to the secondary regulating valve, for continuously adjusting the secondary regulating valve to maintain the sensed parameter of the utilization station at a given level.

2. A flow regulation unit according to claim 1, in which the primary sensing means comprises a first static pressure sensor connected to the inlet conduit and a second static pressure sensor connected to the outlet conduit.

3. A flow regulation unit according to claim 1, in which the secondary sensing means is a thermal sensor for sensing an operating temperature in the utilization station.

4. A regulated flow distribution system for an incompressible process fluid comprising:

a feeder line;

a process fluid source including pumping means for pumping an incompressible process fluid into the feeder line;

a series of utilization stations distributed along the feeder line, each utilization station including its own input pump, an inlet connected to the feeder line, and an outlet;

a return line connecting the outlets of the utilization stations back to the process fluid source;

and a corresponding series of flow regulation units, one for each utilization stations, each flow regulation unit comprising:

an inlet conduit connecting the feeder line to the inlet of the utilization station with which the utilization station to the return line;

a bridge interconnection conduit interconnecting the inlet and outlet conduits;

a primary control means, including pressure sensing means connected to the inlet and outlet conduits and to the primary regulating valve to maintain the pressure differential within a given limited range over a substantial range of absolute inlet flow rates;

a secondary regulating valve interposed in the bridge interconnection conduit;

a secondary sensing means for sensing at least one operating parameter of the utilizing station;

and a secondary control means connected to the secondary sensing means and to the secondary regulating valve for continuously adjusting the secondary regulating valve to maintain the sensed parameter of the utilization station at a given level.

5. A regulated flow distribution system according to claim 4 in which the pressure sensing means of the primary control means in at least one of the flow regulation units comprises a first static pressure sensor connected to the inlet conduit and a second static pressure sensor connected to the outlet conduit.

6. A regulated flow distribution system according to claim 4, in which the secondary sensing means in at least one of the flow regulation units is a thermal sensor for sensing an operating temperature in utilization station with which that flow regulation unit is associated.

* * * * *